United States Patent
Bennett

(10) Patent No.: US 6,836,334 B2
(45) Date of Patent: Dec. 28, 2004

(54) ANGLE RANDOM WALK (ARW) NOISE REDUCTION IN FIBER OPTIC SENSORS USING AN OPTICAL AMPLIFIER

(75) Inventor: Sidney M. Bennett, Chicago, IL (US)

(73) Assignee: KVH Industries, Inc., Middletown, RI (US)

( * ) Notice: Subject to any disclaimer, the term of this patent is extended or adjusted under 35 U.S.C. 154(b) by 224 days.

(21) Appl. No.: 09/998,944

(22) Filed: Oct. 31, 2001

(65) Prior Publication Data

US 2003/0081219 A1 May 1, 2003

(51) Int. Cl.$^7$ ............................................. G01C 19/72
(52) U.S. Cl. ............................................. 356/460
(58) Field of Search .......................... 356/460, 462, 356/464, 483; 250/227.19, 227.27

(56) References Cited

U.S. PATENT DOCUMENTS

| | | | |
|---|---|---|---|
| 4,529,313 A | * | 7/1985 | Petermann et al. ......... 356/460 |
| 4,571,650 A | | 2/1986 | Ojima et al. |
| 4,603,931 A | | 8/1986 | Ruffman |
| 4,615,582 A | | 10/1986 | Lefevre et al. |
| 4,630,229 A | | 12/1986 | D'Hondt |
| 4,630,890 A | | 12/1986 | Ashkin et al. |
| 4,637,722 A | | 1/1987 | Kim |
| 4,668,264 A | | 5/1987 | Dyott |
| 4,669,814 A | | 6/1987 | Dyott |
| 4,697,876 A | | 10/1987 | Dyott |
| 4,705,399 A | | 11/1987 | Graindorge et al. |
| 4,712,866 A | | 12/1987 | Dyott |
| 4,733,938 A | | 3/1988 | Lefevre et al. |
| 4,740,085 A | | 4/1988 | Lim |
| 4,755,021 A | | 7/1988 | Dyott |
| 4,756,589 A | | 7/1988 | Bricheno et al. |
| 4,765,739 A | | 8/1988 | Koizumi et al. |
| 4,776,700 A | | 10/1988 | Frigo |
| 4,796,993 A | | 1/1989 | Sonobe et al. |
| 4,815,817 A | | 3/1989 | Levinson |
| 4,842,409 A | | 6/1989 | Arditty et al. |

(List continued on next page.)

FOREIGN PATENT DOCUMENTS

| | | |
|---|---|---|
| DE | 33 05 104 A1 | 8/1984 |
| DE | 36 15 305 A1 | 11/1987 |

(List continued on next page.)

OTHER PUBLICATIONS

US 6,208,775, 3/2001, Dyott (withdrawn)
Alekseev et al., "Fiber Optic Gyroscope With Suppression of Excess Noise From the Radiation Source", Technical Physical Letters, 24(9): 719–721, Sep. 1998).

(List continued on next page.)

Primary Examiner—Samuel A. Turner
(74) Attorney, Agent, or Firm—Foley Hoag, LLP

(57) ABSTRACT

The invention comprises a system and method for reducing a shot noise component of the Angle Random Walk Noise in a fiber optic sensor by providing a first optical amplifier prior to the photodetector of the sensor to increase the power seen at the detector. An optical amplifier and second detector may be provided to detect a source sample, which can be useful in reducing RIN noise. Optical isolators may be added at the optical amplifiers to prevent rear facet emissions from the optical amplifiers from affecting sensor signals. A coupler with an isolator, amplifier and detector may be provided to receive a sample of the facet emissions from the first optical amplifier, which may be subtracted from the sensor signal at the detector so as to eliminate the facet emissions from the sensor signals. Polarizers may be provided prior to each detector to further eliminate emissions.

47 Claims, 3 Drawing Sheets

U.S. PATENT DOCUMENTS

| | | |
|---|---|---|
| 4,848,910 A | 7/1989 | Dupraz |
| 4,883,358 A | 11/1989 | Okada |
| 4,887,900 A | 12/1989 | Hall |
| 4,943,132 A | 7/1990 | Huang |
| 5,033,854 A | 7/1991 | Matthews et al. |
| 5,048,962 A | 9/1991 | Kurokawa et al. |
| 5,056,919 A | 10/1991 | Arditty et al. |
| 5,063,290 A | 11/1991 | Kersey |
| 5,074,665 A | 12/1991 | Huang et al. |
| 5,080,489 A | 1/1992 | Nishikawa et al. |
| 5,096,312 A | 3/1992 | Huang |
| 5,106,193 A | 4/1992 | Fesler et al. |
| 5,133,600 A | 7/1992 | Schröder |
| 5,135,555 A | 8/1992 | Coyle, Jr. et al. |
| 5,136,235 A | 8/1992 | Brandle et al. |
| 5,289,257 A | 2/1994 | Kurokawa et al. |
| 5,289,258 A | 2/1994 | Szafraniec et al. |
| 5,331,404 A | 7/1994 | Moeller et al. |
| 5,351,123 A | 9/1994 | Spahlinger |
| 5,359,413 A | 10/1994 | Chang et al. |
| 5,365,338 A | 11/1994 | Bramson |
| 5,406,370 A | 4/1995 | Huang et al. |
| 5,412,471 A | 5/1995 | Tada et al. |
| 5,457,532 A | 10/1995 | August et al. |
| 5,459,575 A | 10/1995 | Malvern |
| 5,469,257 A * | 11/1995 | Blake et al. ............... 356/464 |
| 5,469,267 A | 11/1995 | Wang |
| 5,471,301 A | 11/1995 | Kumagai et al. |
| 5,475,772 A | 12/1995 | Hung et al. |
| 5,493,396 A | 2/1996 | Sewell |
| 5,500,909 A | 3/1996 | Meier |
| 5,504,684 A | 4/1996 | Lau et al. |
| 5,513,003 A | 4/1996 | Morgan |
| 5,552,887 A | 9/1996 | Dyott |
| 5,559,908 A | 9/1996 | August et al. |
| 5,602,642 A | 2/1997 | Bergh et al. |
| 5,644,397 A | 7/1997 | Blake |
| 5,654,906 A | 8/1997 | Youngquist |
| 5,655,035 A | 8/1997 | Burmenko |
| 5,682,241 A | 10/1997 | Mark et al. |
| 5,696,858 A | 12/1997 | Blake |
| 5,701,177 A | 12/1997 | Kumagai et al. |
| 5,701,376 A | 12/1997 | Shirasaki |
| 5,767,509 A | 6/1998 | Cordova et al. |
| 5,781,675 A | 7/1998 | Tseng et al. |
| 5,854,864 A | 12/1998 | Knoesen et al. |
| 5,898,496 A | 4/1999 | Huang et al. |
| 5,946,097 A | 8/1999 | Sanders et al. |
| 5,953,121 A | 9/1999 | Bohnert et al. |
| 5,987,195 A | 11/1999 | Blake |
| 6,023,331 A | 2/2000 | Blake et al. |
| 6,025,915 A | 2/2000 | Michal et al. |
| 6,047,095 A | 4/2000 | Knoesen et al. |
| 6,075,915 A | 6/2000 | Koops et al. |
| 6,148,131 A | 11/2000 | Geertman |
| 6,163,632 A | 12/2000 | Rickman et al. |
| 6,185,033 B1 | 2/2001 | Bosc et al. |
| 6,188,811 B1 | 2/2001 | Blake |
| 6,233,371 B1 | 5/2001 | Kim et al. |
| 6,301,400 B1 | 10/2001 | Sanders |
| 6,307,632 B1 | 10/2001 | Blake |
| 6,330,105 B1 * | 12/2001 | Rozelle et al. ............. 356/460 |
| 6,351,310 B1 | 2/2002 | Emge et al. |
| 6,356,351 B1 | 3/2002 | Blake |
| 6,370,289 B1 | 4/2002 | Bennett |
| 6,389,185 B1 | 5/2002 | Meise et al. |
| 6,396,965 B1 | 5/2002 | Anderson |
| 6,434,285 B1 | 8/2002 | Blake et al. |
| 6,535,654 B1 | 3/2003 | Goettsche et al. |

FOREIGN PATENT DOCUMENTS

| | | |
|---|---|---|
| DE | 37 42 201 A1 | 6/1989 |
| EP | 0 551 874 A2 | 7/1993 |
| EP | 0 586 242 A1 | 3/1994 |
| EP | 0 686 867 A1 | 12/1995 |
| EP | 0 722 081 A2 | 7/1996 |
| EP | 856 737 A1 | 8/1998 |
| EP | 0 871 009 A1 | 10/1998 |
| EP | 0 872 756 A1 | 10/1998 |
| FR | 2 535 463 A | 5/1984 |
| JP | 07209398 | 8/1995 |
| JP | 407294264 A * | 11/1995 |
| WO | WO 98/58268 A | 12/1998 |
| WO | WO 00/31551 | 6/2000 |
| WO | WO 00/36425 | 6/2000 |

OTHER PUBLICATIONS

Blake et al., "In–Line Sagnac Interferometer Current Sensor," *IEEE*, pp. 116–121 (1995).

Blake and Szafraniec, "Random Noise in PM and Depolarized Fiber Gyros", OSA Symposium Proceedings, 1997, OWB2, pp. 122–125.

Bohnert et al., "Field Test of Interferometric Optical Fiber High–Voltage and Current Sensors", *SPIE*, vol. 2360 pp. 16–19 (Feb. 1994).

Bohnert et al., "Temperature and Vibration Insensitive Fiber–Optic Current Sensor" *ABB*, vol. 2360 pp. 336–339 (Feb. 1994).

Burns et al., "Excess Noise in Fiber Gyroscope Sources", IEEE Photonics Technology Letter, vol. 2, No. 8, Aug. 1990, pp. 606–608.

Clark et al., "Application of a PLL and ALL Noise Reduction Process in Optical Sensing System," *IEEE Translations on Industrial Electronics*, vol. 44, No. 1, Feb. 1997, pp. 136–138.

Dagenis et al., "Low–Frequency Intensity Noise Reduction for Fiber–Optic Sensor Applications," *Optical Fiber Sensors Conference*, 1992, Jan. 29–31, pp. 177–180.

Dupraz, J.P., "Fiber–Optic Interferometers for Current Measurement: Principles and Technology", Alsthom Review No. 9: 29–44 (Dec. 1987).

Frosio, G. and Dändliker, "Reciprocal Reflection Interferometer for a Fiber–Optic Faraday Current Sensor", Applied Optics 33 (25): 6111–6122 (Sep. 1, 1994).

Gronau Yuval et al.; "Digital Signal Processing For An Open–Loop Fiber–Optic Gyroscope", Applied Optics, Optical Society of America, Washington, U.S., vol. 34, No. 25, Sep. 1995, pp. 5849–5853.

Killian M. Kevin; "Pointing Grade Fiber Optic Gyroscope", IEEE AES Systems Magazine, p. 6–10 (Jul. 1994).

La Violette and Bossler; "Phase Modulation Control for An Interferometric Fiber Optic Gyroscope", IEEE Plan 90 Position Location and Navigation Symposium, Las Vegas, (Mar. 20–23, 1990).

Lefevre, "The Fiber–Optic Gyroscope", Artech House, Boston, pp. 29–30 (1993).

McCallion and Shimazu; "Side–Polished Fiber Provides Functionality and Transparency", Laser Focus World, 34 (9): S19–S24, (Sep. 1, 1998).

Moeller and Burns, "1.06$\mu$m All–fiber Gyroscope with Noise Subtraction, Proceedings of the Conference on Optical Fiber Sensors", IEEE–OSA, Monterey, CA, 1992, pp. 82–85.

Moeller and Burns, "Observation of Thermal Noise in a Dynamically Biased Fiber–Optic Gyro", Optical Letters, 1996, vol. 21, pp. 171–173.

Ono et al.; "A Small–Sized, Compact, Open–loop Fibre–Optic Gyroscope with Stabilized Scale Factor", Meas. Sci. Technol. 1: 1078–1083, (1990.

Polynkin et al.; "All–Optical Noise–Subtraction Scheme for a Fiber–Optic Gyroscope", Optics Letters, 25(3): 147–149, (Feb. 1, 2000).

Rabelo et al.; "SNR Enhancement of Intensity Noise–Limited FOGs", Journal of Lightwave Technology 18(12): 2146–2150 (Dec. 2000).

Short, S. et al., "Elimination of Birefringence Induced Scale Factor Errors in the In–Line Sagnac Interferometer Current Sensor", Journal of Lightwave Technology 16(10): 1844–1850 (Oct. 1998).

Burns, et al., "Excess Noise in Fiber Gyroscope Sources", IEEE Photonics Technology Letter, vol. 2, No. 8, Aug. 1990, pp. 606–608.

Clark et al., "Application of a PLL and ALL Noise Reduction Process in Optical Sensing System," *IEEE Translations on Industrial Electronics*, vol. 44, No. 1, Feb. 1997, pp. 136–138.

Dagenais et al., "Low–Frequency Intensity Noise Reduction for Fiber–Optic Sensor Applications," *Optical Fiber Sensors Conference*, Jan. 29–31,1992, pp. 177–180.

Dupraz, J.P., "Fiber–Optic Interferometers for Current Measurement: Principles and Technology", Alsthom Review No. 9: 29–44 (Dec. 1987).

Frosio, G. and Dändliker, "Reciprocal Reflection Interferometer for a Fiber–Optic Faraday Current Sensor", Applied Optics 33 (25): 6111–6122 (Sep. 1, 1994).

Gronau Yuval et al.; "Digital Signal Processing For An Open–Loop Fiber–Optic Gyroscope", Applied Optics, Optical Society of America, Washington, U.S., vol. 34, No. 25, Sep. 1, 1995 pp. 5849–5853.

Killian M. Kevin; "Pointing Grade Fiber Optic Gyroscope", IEEE AES Systems Magazine, pp. 6–10 (Jul. 1994).

LaViolette and Bossler: "Phase Modulation Control for An Interferometric Fiber Optic Gyroscope", IEEE Plan 90, Position Location and Navigation Symposium, Las Vegas, (Mar. 20–23, 1990).

Lefevre, "The Fiber–Optic Gyroscope", Artech House, Boston, pp. 29–30 (1993).

McCallion and Shimazu; "Side–Polished Fiber Provides Functionality and Transparency", Laser Focus World, 34 (9): S19–S24 , (Sep. 1, 1998).

Moeller and Burns, "1.06$\mu$m All–fiber Gyroscope with Noise Subtraction, Proceedings of the Conference on Optical Fiber Sensors", IEEE–OSA, Monterey, CA, 1992, pp. 82–85.

Moeller and Burns, "Observation of Thermal Noise in a Dynamically Biased Fiber–Optic Gyro", Optical Letters, 1996, vol. 21, pp. 171–173.

Nikos Drakos, "Circular Polarization States for Light, and Quarter–Wave Plates," *Computer Based Learning Unit, University of Leeds* (Mar. 2, 1998).

Ono et al.; "A Small–Sized, Compact, Open–Loop Fibre–Optic Gyroscope with Stabilized Scale Factor", Meas. Sci. Technol. 1: 1078–1083, (1990.

Polynkin et al.; "All–Optical Noise–Subtraction Scheme for a Fiber–Optic Gyroscope", Optics Letters, 25(3): 147–149, (Feb. 1, 2000).

Rabelo et al.; "SNR Enhancement of Intensity Noise–Limited FOGs", Journal of Lightwave Technology 18(12):2146–2150 (Dec. 2000).

Short, S. et al., "Elimination of Birefringence Induced Scale Factor Errors in the In–Line Sagnac Interferometer Current Sensor", Journal of Lightwave Technology 16 (10): 1844–1850 (Oct. 1998).

\* cited by examiner

ANGLE RANDOM WALK (ARW) NOISE REDUCTION IN FIBER OPTIC SENSORS USING AN OPTICAL AMPLIFIER

FIELD

This invention generally relates to fiber optic sensors, and more specifically to using optical amplifiers to improve Angle Random Walk noise in fiber optic sensors by increasing the optical power at a detector of the fiber optic sensor.

BACKGROUND

The angle random walk noise (ARW) of a fiber optic sensor, such as a fiber optic current sensor or fiber optic gyroscope, is comprised of noise arising from the transimpedance amplifier feedback resistor (thermal noise), shot noise related to the detector current, and flicker (1/f) and relative intensity noise (RIN) intrinsic in the light impinging on the photodetector. The first is independent of the light power, the second can be shown to be proportional to the square root of optical power, and the last two (flicker, RIN) are proportional to the optical power. What this means is that for any given sensor configuration (coil length, diameter, light source power, etc.), the effects of thermal and shot noise will decrease with increasing optical power, while the flicker noise and RIN effects cannot be reduced by increasing the optical power. For convenience, RIN will be used hereafter to refer to both flicker noise and true RIN effects.

The noise components in the sensor output can be represented as:

$$N = k(A^2 P^2 + B^2 P + C^2)^{1/2} \qquad \text{Eq. (1)}$$

where

A is the RIN noise;

B is the shot noise;

C is the thermal noise;

P is the optical power at the detector; and k is a proportionality constant.

The output signal of an open-loop fiber optic gyroscope (FOG) for small rotation rates is $$S = m\phi\Omega P, \qquad \text{Eq. (2)}$$

where $\Omega$ is the angular rotation rate;

m is a proportionality constant;

$\phi = 4\pi RL/c \lambda$ is the Sagnac or optical scale factor;

R is the radius of the equivalent coil; and

L is the coil length.

Thus, the signal-to-noise ratio is:

$$S/N = m\phi\Omega/(k(A^2 + B^2/P + C^2/P^2)^{1/2}) \qquad \text{Eq. (3)}$$

and the shot and thermal noise components decrease as the optical power is increased. However, the contribution of RIN to the signal-to-noise is unchanged and the performance of a FOG with conventional signal processing ultimately becomes limited by RIN. Usually the thermal noise component can be ignored.

FIG. 5 illustrates the dependence of the individual noise components as a function of detected optical power. (Lefevre, "The Fiber-Optic Gyroscope", Artech House, Boston 1993). The inverse of the signal-to-noise ratio or relative noise is shown on the ordinate and is called the "Angle Random Walk" (ARW). This can be interpreted as the minimum detectable rotation signal when normalized to a one Hz bandwidth. In FIG. 5, "source noise" represents the RIN.

The reduction of RIN is addressed in "Apparatus and Method for Electronic RIN Reduction in Fiber-Optic Sensors", by Bennett, U.S. patent application Ser. No. 09/481,159. Here we look at the shot noise for situations where either the RIN had been reduced to the point where shot noise is dominant, or situations where the detected power is low enough so that the shot noise can be considered the dominant component. (In the context of FIG. 5, a region where shot noise is dominant exists between optical powers of $10^{-5}$ and $10^{-4}$ watts.). To simplify the discussion, we will assume that shot noise is the only noise present.

Shot noise arises from the interaction of individual photons in the light beam incident on the detector with the physical matter of the detector itself. The effect is quantized in nature so that some number (which could be fractional) of electrons is liberated for each photon impinging on the detector in a spectral regime where the detector exhibits a photoelectric effect.

From this discussion, it can be seen that the concept of detected signal-to-noise differs fundamentally from that employed in radio reception systems. In those systems, the noise power is not a function of the input signal, and signal-to noise ratio increases linearly with signal power. Even in optical telecommunications systems, where the thermal, shot and RIN noise components are present, RIN noise can be reduced by limiting the bandwidth of the optical signal at the input to the photodetector to that required by the modulation bandwidth by optical bandlimiting. In a fiber optic sensor, this is not possible, as a broad optical bandwidth (usually greater than several nanometers) is necessary to overcome certain deleterious optical effects, such as polarization cross-coupling and Rayleigh scattering.

The component of ARW due to shot noise can be reduced, by increasing the optical power at the detector. This is done in existing art by increasing the optical power emitted by the optical source, which may be a superluminescent diode (SLD), a semiconductor laser operated below threshold, a laser modified as in "Broadening the Linewidth of a Semiconductor Laser" by Dyott, U.S. patent application Ser. No. 09/568,371 which is incorporated herein be reference, or a rare-earth-doped fiber amplifier. This is usually done in the so called "minimum configuration" (MC) fiber optic gyroscope, but may also be done in the "Reduced Minimum Configuration" (RMC) device ("Monomode Optical Fiber Ring Interferometric Device with Semiconductor Diode as Light Energy Emission Reception/Amplification Means", U.S. Pat. No. 4,842,409 to Arditty, et al. and "Reduced Minimum Configuration Interferometric Fiber Optic Gyroscope with Simplified Signal Processing Electronics", U.S. patent application Ser. No. 09/459,438 by Emge et al.). High power optical sources are known and used, but the cost of these devices increases substantially as the optical power is increased, and the reliability also is reduced due to various damage mechanisms that arise at high optical power densities. It is also known that the fiber exhibits a number of non-reciprocal effects and non-linearities at high optical powers, which can lead to degradation of other desired properties such as bias stability and scale factor.

SUMMARY

According to the systems and methods disclosed herein, a shot noise component of Angle Random Walk noise in a fiber optic sensor may be reduced by providing an optical amplifier between a first coupler receiving a sensor signal from a sensing coil of the sensor and a photodetector receiving the sensor signal from the first coupler.

Another embodiment may further comprise providing a second detector on a free leg of the first coupler to receive a source sample from an optical source of the fiber optic sensor; delaying the source sample to provide a delayed source sample coinciding with the sensor signal; modulating the delayed source sample to provide a modulated source sample; and comparing the modulated source sample with the sensor signal so as to subtract Relative Intensity Noise.

Another embodiment may further comprise providing an isolator between the first coupler and the optical amplifier to suppress back facet emissions of the optical amplifier reaching the first coupler.

Another embodiment may further comprise: providing an additional coupler between the optical amplifier and the isolator; providing a third detector on a first leg of the additional coupler to receive the back facet emissions from the optical amplifier; and subtracting the back facet emissions received at the third detector from the sensor signal received at the photodetector.

A still further embodiment further comprises providing a polarizer immediately adjacent one or more of the detectors to preclude emissions in an unwanted polarization from reaching the detector to which the polarizer is adjacent.

BRIEF DESCRIPTION OF THE DRAWINGS

The above-mentioned and other features will now become apparent by reference to the following description taken in connection with the accompanying drawings, in which like reference numerals refer to like elements. The depicted embodiments are to be understood as illustrative and not as limiting in any way.

DETAILED DESCRIPTION OF THE PREFERRED EMBODIMENT(S)

Figure 1:
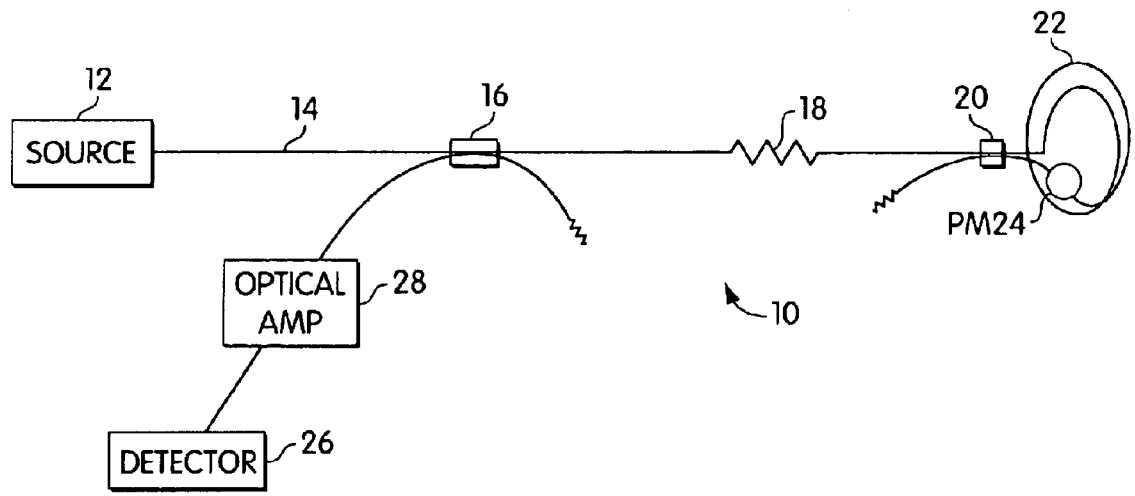
FIG. 1 illustrates a Minimum Configuration (MC) fiber optic gyroscope having an optical amplifier.

FIG. 1 illustrates a minimum configuration (MC) fiber optic gyroscope 10, having an optical source 12, providing an optical signal or beam on fiber 14. At first directional coupler 16, a portion of the signal may be directed through linear polarizer 18 and to second directional coupler 20, where the signal may be split and directed into opposite ends of fiber optic coil 22 as counterpropagating beams. The counterpropagating beams may then be modulated at phase modulator 24. The beams exit coil 22 and combine/interfere at second coupler 20. The combined beams may then pass through polarizer 18 to first coupler 16, where a portion of the beam may be directed towards detector 26. In the embodiment of FIG. 1, according to the present invention, optical amplifier 28 can be interspersed between first coupler 16 and detector 26.

MC fiber optic gyroscopes constructed in the manner of FIG. 1, but without optical amplifier 28, are known in the art.

A prior art MC fiber optic gyroscope of this sort may have an insertion loss between the source 12 and detector 26 of approximately 15 dB, i.e., a factor of 32. So, the optical power at the detector 26 may be reduced by this amount with respect to that which obtains at the source 12. With optical amplifier 28 inserted in the fiber immediately preceding the detector 26, the signal power can be increased by the gain factor G of the amplifier, and the ARW reduced.

For example, if the gain of the optical amplifier 28 was equal to that of the loss in the optical circuit, the ARW would be reduced by a factor of approximately 5.6 (i.e., $\sqrt{32}$), were the shot noise the only noise present. Alternatively this could have been achieved by an increase in the optical source output power by a factor of 32.

Optical amplifier 28 can be of the form of a Semiconductor Optical Amplifier (SOA), rare-earth-doped fiber amplifier, or similar optical amplification medium. The amplifier 28 bandwidth can be comparable to that of the optical source 12 and desirably can have a similar variation of central wavelength with temperature.

As is known, optical amplifiers can be the equivalent of Fabry-Perot lasers whose end face reflectivity is sufficiently low that lazing does not occur. Providing that the following inequality can observed, $G_s/(R_1 R_2) < 0.17$, where $R_1$ and $R_2$ are the reflectivities of the two facets and $G_s$ is the single pass internal gain, the ripple in the amplifier passband can be less than 3 dB (High Speed Optical Communications, R. Sabella and P. Lugli, Kluwer Academic Publishers, 1999). Such amplifiers may sometimes be called traveling wave optical amplifiers (TWA). The term SOA as used herein may include the TWA. Optical amplifiers may often be polarization sensitive, so, it may be preferred to use a polarization insensitive configuration, or the coupler 16 used to isolate optical source 12 and detector 26 may be of the polarization maintaining type and the light energy of the MC fiber optic gyroscope 10 may be oriented in the axis of maximum optical amplifier 28 gain.

Optical amplifiers, such as optical amplifier 28, emit broadband energy similar to the broadband energy emitted by optical source 12, which, in the case of optical source 12, is used as the sensing energy in gyroscope 10. Optical source 12 energy passes through coil 22, and both senses rotation and is modulated by the phase modulator 24 such that it can be distinguished, by a frequency dependent detection technique, from the steady energy emitted from source 12. The broadband output of the optical amplifier 28 in the forward direction (i.e., towards the photodetector 26) does not pass through the sensing circuit, or coil 22, and carries no information related to the rotation. However, this energy creates both shot noise arising from its own photon stream and, due to its optical bandwidth, spontaneous beat noise arising from the demodulation of the optical components due to the square law property of the photodector. The latter noise is equivalent in nature to the RIN arising from the broadband nature of the gyro optical sources. Methods of reducing RIN are discussed in Bennett, U.S. patent application Ser. No. 09/481,159, and references cited therein.

The design of the gyroscope 10 should minimize the contributions of the amplifier noise sources to the overall gyroscope noise as these will reduce the improvement arising from the amplification. However, the spontaneous emission of optical amplifier 28 in the backward direction (i.e., in the direction from amplifier 28 to coupler 16) passes through the coil 22 and is returned as a modulated signal containing information about the gyroscope rotation rate, essentially identical to that which was imparted to the optical signal or beam from the optical source 12. This signal is amplified in optical amplifier 28 and detected by the photodetector 26. The spontaneous emission of amplifier 28 is not correlated with that of the optical source 12. Hence the power in the two signals will add without changing the relationship of the amplitudes or phases in the spectral components. If the gyroscope signal at the photodector 26 arising from amplifier 28 spontaneous emission, which has passed through fiber coil 22, is comparable to or greater than that due to the optical source 12, a further improvement in ARW may be obtained as the effective signal power has been further increased. Alternatively, as discussed below, an optical isolator can be inserted between amplifier 28 and coupler 16, permitting the optical signal from the gyroscope to pass through to amplifier 28 and detector 26, but blocking light transmission in the reverse direction.

Figure 2:
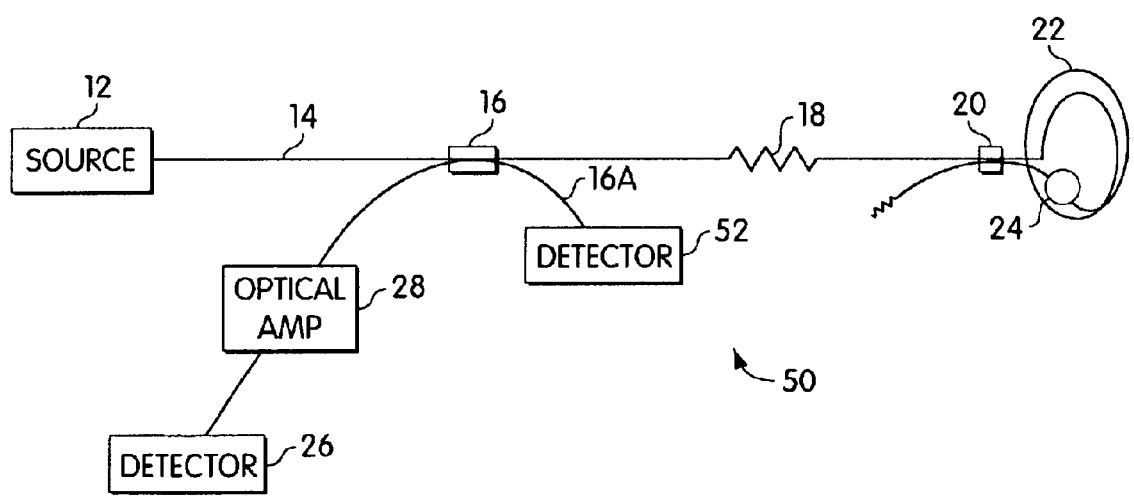
FIG. 2 illustrates an embodiment of a fiber optic gyroscope having a second detector.

Referring now to FIG. 2, there is shown fiber optic sensor 50, including optical source 12, fiber 14, couplers 16, 20, polarizer 18, coil 22, phase modulator 24, detector 26 and optical amplifier 28, as were identified in the embodiment of FIG. 1. A second detector 52 is positioned on leg 16a of coupler 16 in the manner of Bennett, U.S. patent application Ser. No. 09/481,159, to obtain a sample of the source 12 optical power that has not passed through the sensing region of sensor 50, i.e., polarizer 18, second coupler 20, coil 22 and phase modulator 24, as also described in FIG. 1. When appropriately delayed and modulated by a replica of the gyroscope signal, the sample of the source 12 optical power can be used to subtract the RIN, permitting further improvement of the ARW by increasing the signal power.

It can be understood that couplers 16 and 20, as well as couplers to be described hereafter, operate in a manner known in the art. A coupler may be attached to a first fiber such that the first fiber is coupled to a second fiber, the second fiber typically referred to herein as the legs of the coupler. A beam from the first or second fiber coming into the coupler from one direction is split into the first and second fibers upon exiting the coupler. Beams entering the coupler from both the first and second fiber combine/interfere with each other at the coupler and the combined/interfered beam is split into the first and second fibers upon exiting the coupler. As an example, coupler 16 can be attached to first fiber 14 to couple fiber 14 to a second fiber, or legs of coupler 16, one leg including detector 26 and optical amplifier 28 and the other leg (16a) including detector 52. The beams entering coupler 16 can combine/interfere and split as described, consistent with coupler operation as known in the art.

Figure 3:
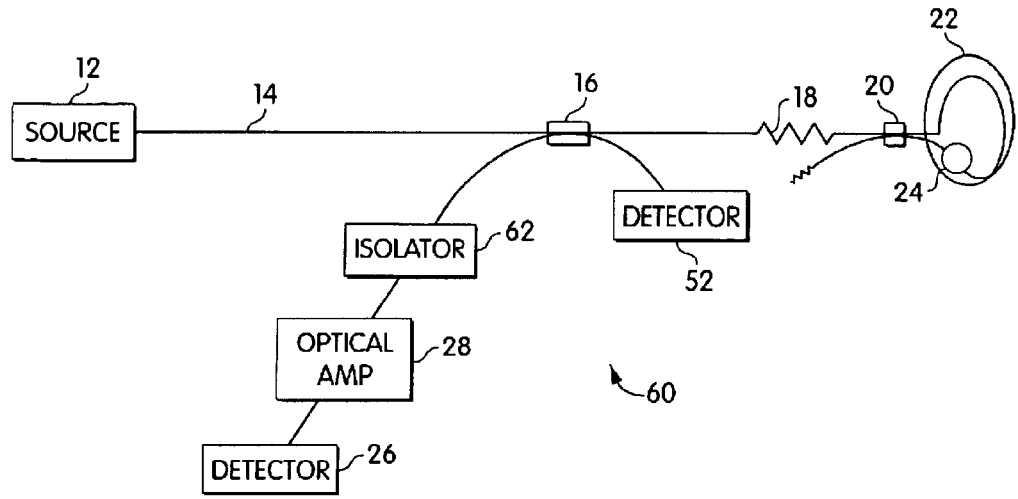
FIG. 3 illustrates a further embodiment of a fiber optic gyroscope having an isolator.

Referring back to FIG. 2, when an optical amplifier, such as optical amplifier 28 of FIGS. 1 and 2, is used, spontaneous emissions can occur from both the front and back facets of the amplifier. The back facet output would also be received at second detector 52. FIG. 3 shows a fiber optic sensor 60 having an optical isolator 62 inserted between the coupler 16 and optical amplifier 28. The isolator 62 passes the light traveling from the sensing region of sensor 60, i.e., polarizer 18, second coupler 20, coil 22 and phase modulator 24, to the detector 26 so that it can be amplified, while preventing the rear facet emissions of optical amplifier 28 from reaching the second detector 52.

Figure 4:
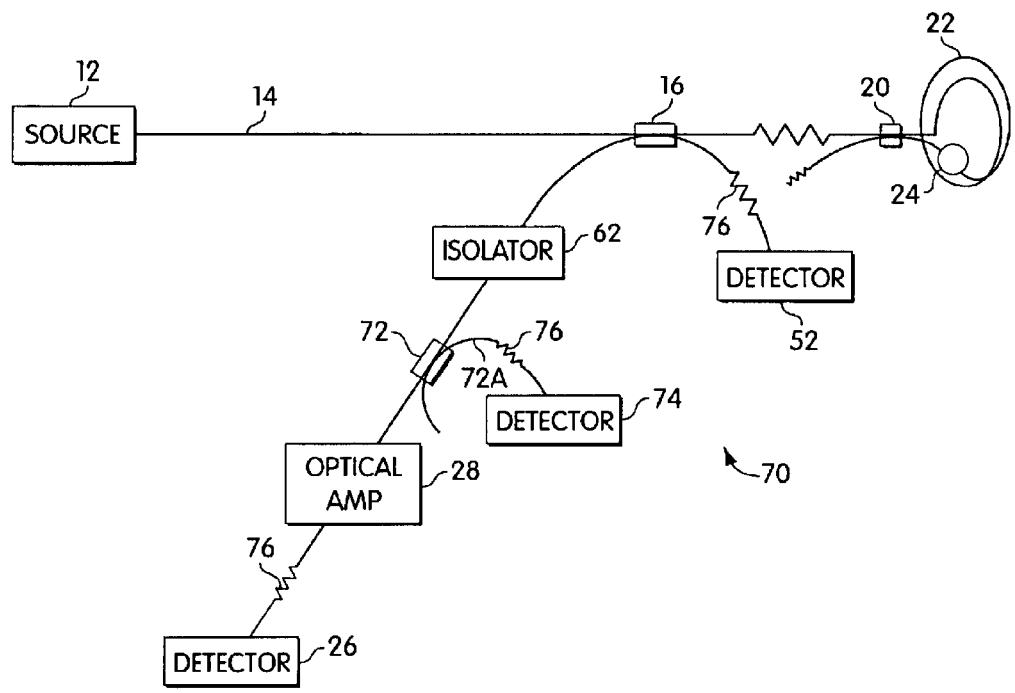
FIG. 4 illustrates another embodiment of a fiber optic gyroscope having an additional coupler and detector.

If a sample of the spontaneous emission noise can be obtained from the optical amplifier 28, it too can be subtracted from the signal at the detector 26, in the manner suggested by Bennett in U.S. patent application Ser. No. 09/481,159. As there may be essentially no delay between the reception of the spontaneous emission at an auxiliary detector and reception of the signal at detector 26, and the spontaneous emission signal is not modulated, the process amounts to a direct subtraction. Such a signal can be obtained in fiber optic sensor 70 shown in FIG. 4.

Fiber optic sensor 70 has additional directional coupler 72 inserted between optical amplifier 28 and isolator 62, with third detector 74 positioned on leg 72a of third coupler 72, so as to receive signals from the direction of optical amplifier 28. By subtracting the signal received at third detector 74 from those at detector 26, the spontaneous emission signal from optical amplifier 28 may be eliminated from the signal at detector 26.

Figure 5:
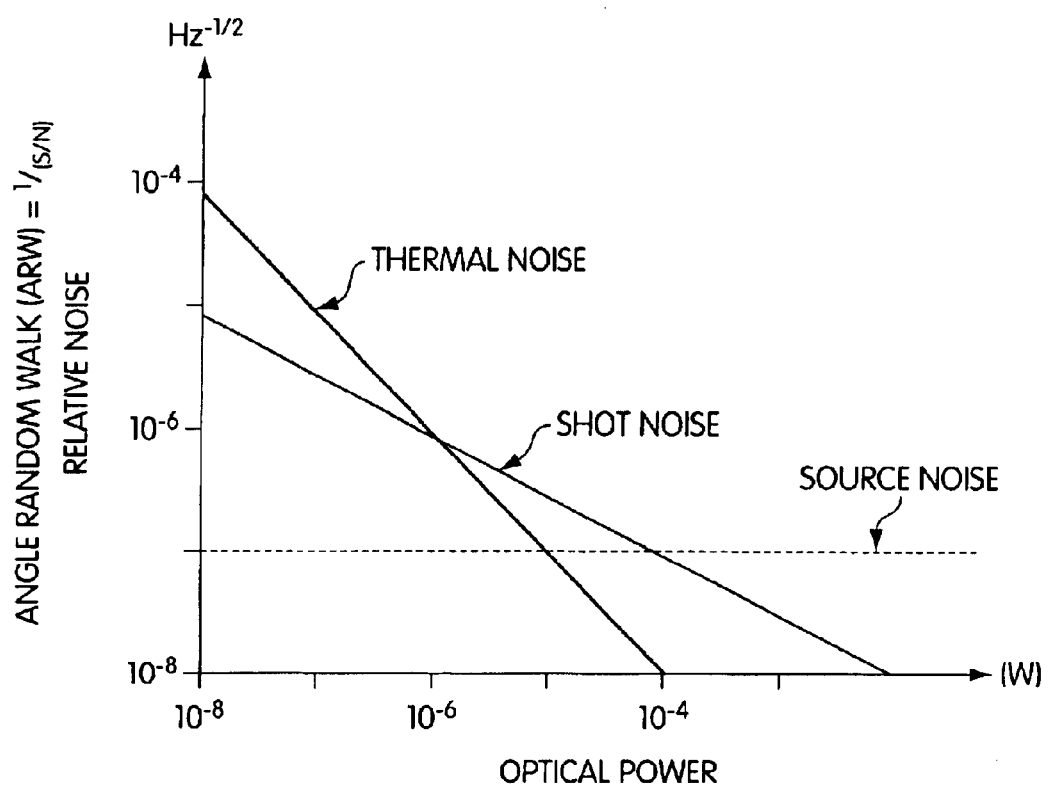
FIG. 5 is a graph illustrating the relationship between optical power at the photodetector and noise components.

The combination of RIN reduction with optical amplification increases the potential improvement in ARW associated with optical amplification through the reduction of the RIN noise floor shown in FIG. 5.

The methods outlined herein can also be used in similar optical circuits which are used in conjunction with a Faraday effect current sensor, with the sensing element either a coil of sensing fiber or a reflective coil, e.g., as shown by Guido Frosio and Rene Dandliker, "Reciprocal Reflection Interferometer for a Fiber-Optic Faraday Current Sensor," Applied Optics, Sep. 1, 1994, vol. 33, No. 25, pp. 6111–6122. Often in such circuits, the polarization maintaining fiber used to connect the sensing coil is longer than might be used in a low cost gyroscope sensor and the received optical power at the detector may be insufficient to achieve the desired sensitivity. Utilizing an optical amplifier in the manner shown, i.e., prior to the detector, can be an inexpensive method of overcoming the optical circuit losses.

While the embodiments have been described for optical circuits constructed from all-fiber components, the concept can be equally applicable to gyroscopes and current sensors employing integrated optical circuit chips in Lithium Niobate or other optical waveguide material, including concepts where the optical coil itself may be created on a substrate material. It can also be equally valid for signal processing concepts known as "closed loop", since the embodiments as described improve the signal to noise ratio at the output of the photodector.

It is known that many optical sources and optical amplifiers have a relatively strong preference for emission or amplification of one polarization rather than another. Generally, the preferred polarization can be selected to be the same as that which exhibits the minimum loss when transiting the polarizer associated with the gyroscope or current sensor optical circuit. It will be appreciated that the emissions in the unwanted polarization can contribute to the noise at each detector, without any corresponding benefit. For the highest performance, this energy should be precluded from reaching the photodetectors. This may preferably be accomplished by inserting polarizers 76, having minimum insertion loss in the desired polarization, immediately prior to each detector 26, 52, 74. Though illustrated in FIG. 4 only, it will be understood that polarizers 76 also can be inserted prior to detectors 26 and 52 of FIGS. 1–3.

It is seen that the maximum optical power required at any point in the optical circuit of FIGS. 1–4 can be minimized when compared with configurations not having optical amplifier 28, where all of the power may be generated at the optical source. This improves the reliability of the sensor while minimizing the product cost.

It can be appreciated that a semiconductor optical amplifier may be a broadband source of optical energy whose bandwidth may be typical of that desired for the sensor optical source. It follows that a semiconductor optical amplifier can be substituted for the conventional optical source and used with or without the optical amplifier 28, depending on the noise performance required. In applications where power levels may be low, optical amplifiers (not shown) also may be provided prior to detectors 52 and 74. Additional isolators (not shown) between these optical amplifiers and their respective couplers also may be provided.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for reducing noise in a fiber optic sensor comprising an optical source providing optical power to a sensing coil through an optical fiber and a first coupler positioned between the optical source and the sensing coil to direct a sensor signal from the sensing coil to a photodetector, the method comprising:
   (a) providing an optical amplifier between the first coupler and the photodetector;
   (b) providing an isolator between the first coupler and the optical amplifier to suppress back facet emissions of the optical amplifier;
   (c) providing a second coupler between the optical amplifier and the isolator;
   (d) providing a second detector on a leg of the second coupler to receive the back facet emissions from the optical amplifier; and
   (e) subtracting the back facet emissions received at the second detector from the sensor signal and front facet emissions of the optical amplifier received at the photodetector.

2. The method of claim 1, further comprising providing a polarizer immediately adjacent an input of at least one of the photodetector and the second detector, the polarizer allowing emissions in a preferred polarization to reach the at least one of the photodetector and the second detector to which the polarizer is adjacent.

3. The method of claim 1, further comprising providing a polarizer immediately adjacent an input of the photodetector to allow emissions in a preferred polarization to reach the photodetector.

4. The method of claim 1, comprising choosing the optical amplifier from one of a semiconductor optical amplifier, a rare-earth doped fiber amplifier and a traveling wave optical amplifier.

5. The method of claim 1, comprising configuring the sensor as a fiber optic current sensor.

6. The method of claim 5, comprising configuring the sensing coil as a reflective coil.

7. The method of claim 1, comprising configuring the sensor as a fiber optic gyroscope (FOG).

8. The method of claim 7, comprising configuring the FOG as one of a closed loop FOG and an open loop FOG.

9. The method of claim 1, comprising employing integrated optical circuits in optical waveguide material as components of the sensor.

10. The method of claim 9, comprising forming the optical waveguide material of lithium niobate.

11. The method of claim 9, comprising fabricating the sensing coil on a substrate material.

12. A method for reducing noise in a fiber optic sensor comprising an optical source providing optical power to a sensing coil through an optical fiber and a first coupler positioned between the optical source and the sensing coil to direct a sensor signal from the sensing coil to a photodetector, the method comprising:
   (a) providing an optical amplifier between the first coupler and the photodetector;
   (b) providing an isolator between the first coupler and the optical amplifier to suppress back facet emissions of the optical amplifier;
   (c) providing a second detector on a free leg of the first coupler to receive a source sample from the optical source;
   (d) delaying the source sample to provide a delayed source sample coinciding with the sensor signal;
   (e) modulating the delayed source sample to provide a modulated source sample;
   (f) subtracting the modulated source sample from the sensor signal to subtract a relative intensity noise;
   (g) providing a second coupler between the optical amplifier and the isolator;
   (h) providing a third detector on a first leg of the second coupler to receive the back facet emissions from the optical amplifier; and
   (i) subtracting the back facet emissions received at the third detector from the sensor signal and front facet emissions of the optical amplifier received at the photodetector.

13. The method of claim 12, further comprising providing a polarizer immediately adjacent an input of at least one of the photodetector and the second detector, the polarizer allowing emissions in a preferred polarization to reach the at least one of the photodetector and the second detector to which the polarizer is adjacent.

14. The method of claim 12, further comprising providing a polarizer immediately adjacent an input of at least one of the photodetector, the second detector and the third detector, the polarizer allowing emissions in a preferred polarization to reach the at least one of the photodetector, the second detector and the third detector to which the polarizer is adjacent.

15. A fiber optic sensor, comprising:
   (a) an optical source providing optical power to a sensing coil of the fiber optic sensor through an optical fiber;
   (b) a first coupler positioned between the sensing coil and the optical source;
   (c) a photodetector positioned on a leg of the first coupler;
   (d) an optical amplifier positioned between the first coupler and the photodetector;
   (e) an isolater positioned between the first coupler and the optical amplifier;
   (f) a second coupler positioned between the optical amplifier and the isolator;
   (g) a second detector positioned on a leg of the second coupler; and
   (h) a subtractor.

16. The sensor of claim 15, wherein the optical source is an optical amplifier power source.

17. The sensor of claim 15, further comprising a polarizer positioned immediately adjacent an input of at least one of the photodetector and the second detector.

18. The sensor of claim 17, wherein the optical source is an optical amplifier power source.

19. The sensor of claim 15, further comprising a polarizer positioned immediately adjacent an input of the photodetector.

20. The sensor of claim 15, wherein the optical amplifier is a semiconductor optical amplifier.

21. The sensor of claim 15, wherein the optical amplifier is a rare-earth doped fiber amplifier.

22. The sensor of claim 15, wherein the optical amplifier is a traveling wave optical amplifier.

23. The sensor of claim 15, wherein the sensor is a fiber optic current sensor.

24. The sensor of claim 23, wherein the sensing coil is a reflective coil.

25. The sensor of claim 15, wherein the sensor is a fiber optic gyroscope (FOG).

26. The sensor of claim 25, wherein the FOG is a closed loop FOG.

27. The sensor of claim 25, wherein the FOG is an open loop FOG.

28. The sensor of claim 15, wherein the sensor employs integrated optical circuits in optical waveguide material.

29. The sensor of claim 28, wherein the optical waveguide material is lithium niobate.

30. The sensor of claim 28, wherein the sensing coil is created on a substrate material.

31. A fiber optic sensor, 15, further comprising:
    (a) an optical source providing optical power to a sensing coil of the fiber optic sensor through an optical fiber;
    (b) a first coupler positioned between the sensing coil and the optical source;
    (c) a photodetector positioned on a leg of the first coupler to receive a sensing signal of the sensing coil;
    (d) an optical amplifier positioned between the first coupler and the photodetector; an isolater positioned between the first coupler and the optical amplifier;
    (e) an isolator positioned between the first coupler and the optical amplifier;
    (f) a second detector positioned on a free lea of the first coupler to receive a source sample from the optical source;
    (g) a delay to provide a delayed source sample coinciding with the sensing signal;
    (h) a modulator to provide a modulated delayed source sample;
    (i) a subtractor to subtract the modulated delayed source sample from the sensing signal;
    (j) a second coupler positioned between the optical amplifier and the isolator;
    (k) a third detector positioned on a leg of the second coupler to receive back facet emissions from the optical amplifier; and
    (l) a subtractor to subtract the back facet emissions from the sensing signal and front facet emissions of the optical amplifier received at the photodetector.

32. The sensor of claim 31, further comprising an additional optical amplifier positioned between at least one of the second and third detectors and their respective couplers.

33. The sensor of claim 32, further comprising an isolator positioned between the additional optical amplifier and the respective coupler.

34. The sensor of claim 31, further comprising a polarizer positioned immediately adjacent an input of at least one of the photodetector, the second detector and the third detector.

35. The sensor of claim 34, wherein the optical source is an optical amplifier power source.

36. A fiber optic sensor, comprising:
    (a) an optical source providing optical power to the fiber optic sensor through an optical fiber;
    (b) a sensor coil having a first end and a second end generating a sensing signal;
    (c) a first coupler positioned between the optical source and the sensor coil;
    (d) a first photodetector positioned on a free leg of the first coupler to receive a sensing signal;
    (e) a linear polarizer positioned between the first coupler and the sensor coil;
    (f) a second coupler positioned between the linear polarizer and the two ends of the sensor coil;
    (g) a phase modulator positioned between the first end of the sensor coil and the second coupler;
    (h) an optical amplifier positioned between the first coupler and the first photodetector;
    (i) a second photodetector positioned on another leg of the first coupler to receive a source sample from the optical source;
    (j) a delay to provide a delayed source sample coinciding with the sensing signal;
    (k) a sample modulator to provide a modulated delayed source sample;
    (l) a sample subtractor to subtract the modulated delayed source sample from the sensing signal;
    (m) an isolator positioned between the first coupler and the optical amplifier to suppress back facet emissions of the optical amplifier emitted in a direction towards the first coupler;
    (n) a third coupler positioned between the optical amplifier and the isolator;
    (o) a third photodetector positioned on a leg of the third coupler to receive the back facet emissions from the optical amplifier;
    (p) an emissions subtractor to subtract the back facet emissions from the sensing signal and front facet emissions of the optical amplifier received at the first photodetector; and
    (q) an additional linear polarizer positioned immediately adjacent an input of at least one of the photodetectors.

37. The sensor of claim 36, wherein the optical amplifier is a semiconductor optical amplifier.

38. The sensor of claim 36, wherein the optical amplifier is a rare-earth doped fiber amplifier.

39. The sensor of claim 36, wherein the optical amplifier is a traveling wave optical amplifier.

40. The sensor of claim 36, wherein the sensor is a fiber optic current sensor.

41. The sensor of claim 40, wherein the sensing coil is a reflective coil.

42. The sensor of claim 36, wherein the sensor is a fiber optic gyroscope (FOG).

43. The sensor of claim 42, wherein the FOG is a closed loop FOG.

44. The sensor of claim 42, wherein the FOG is an open loop FOG.

45. The sensor of claim 36, wherein the sensor employs integrated optical circuits in optical waveguide material.

46. The sensor of claim 45, wherein the optical waveguide material is lithium niobate.

47. The sensor of claim 45, wherein the sensing coil is created on a substrate material.

* * * * *